United States Patent [19]

Chaussepied et al.

[11] Patent Number: 5,443,099
[45] Date of Patent: Aug. 22, 1995

[54] TUBE OF COMPOSITE MATERIAL FOR DRILLING AND/OR TRANSPORT OF LIQUID OR GASEOUS PRODUCTS, IN PARTICULAR FOR OFFSHORE OIL EXPLOITATION AND METHOD FOR FABRICATION OF SUCH A TUBE

[75] Inventors: Jacqes E. C. Chaussepied, St Medard en Jalles; Michel Huvey, Bougival; Pierre Odru, Fontenay Sous Bois; Charles P. Sparks, Le Vesinet, all of France

[73] Assignees: Aerospatiale Societe Nationale Industrielle, Paris; Institut Francais Du Petrole, Rueil-Malmaison, both of France

[21] Appl. No.: 971,172

[22] Filed: Nov. 4, 1992

[30] Foreign Application Priority Data

Nov. 5, 1991 [FR] France ................. 91 13846

[51] Int. Cl.⁶ ............... F16L 39/00; F16L 47/06
[52] U.S. Cl. ................. 138/109; 138/139; 285/149
[58] Field of Search ........... 138/109, 103, 104, 137, 138/138, 139, 140, 141, 153; 285/149, 242

[56] References Cited

U.S. PATENT DOCUMENTS

| | | | |
|---|---|---|---|
| 3,406,724 | 10/1968 | Carlstrom | 138/137 |
| 3,467,764 | 9/1969 | Knapp | 174/74 |
| 4,465,105 | 8/1984 | Slater | 138/109 |
| 4,530,379 | 7/1985 | Policelli | 138/109 |
| 4,567,916 | 2/1986 | Antal et al. | 138/109 |
| 4,813,715 | 3/1989 | Policelli | 138/109 |
| 4,895,185 | 1/1990 | Champleboux et al. | 138/109 |
| 5,080,943 | 1/1992 | Chulpsa | 138/109 |
| 5,084,314 | 1/1992 | Igarashi et al. | 138/125 |
| 5,105,854 | 4/1992 | Cole et al. | 138/109 |
| 5,176,180 | 1/1993 | Williams et al. | 138/132 |

FOREIGN PATENT DOCUMENTS

| | | |
|---|---|---|
| 0266810 | 5/1988 | European Pat. Off. |
| 2656403 | 6/1991 | European Pat. Off. |
| 2335784 | 7/1977 | France |
| 1188793 | 3/1965 | Germany |
| 1522240 | 8/1978 | United Kingdom |
| 185161 | 9/1966 | U.S.S.R. |

*Primary Examiner*—David A. Scherbel
*Assistant Examiner*—Patrick Brinson
*Attorney, Agent, or Firm*—Roylance, Abrams, Berdo & Goodman

[57] ABSTRACT

A tube includes a tubular part of composite material with a thermosetting resin matrix. A metallic end coupling member is connected to one end of the tubular part and is engaged at least partially inside the tubular part. A tubular covering member of impermeable material is placed over the inner face of the tubular part and is integrally attached to the tubular part. An impermeable joint is formed between the end coupling member and the covering member. The inner face of the tubular part is covered by the end coupling member and the covering member.

22 Claims, 5 Drawing Sheets

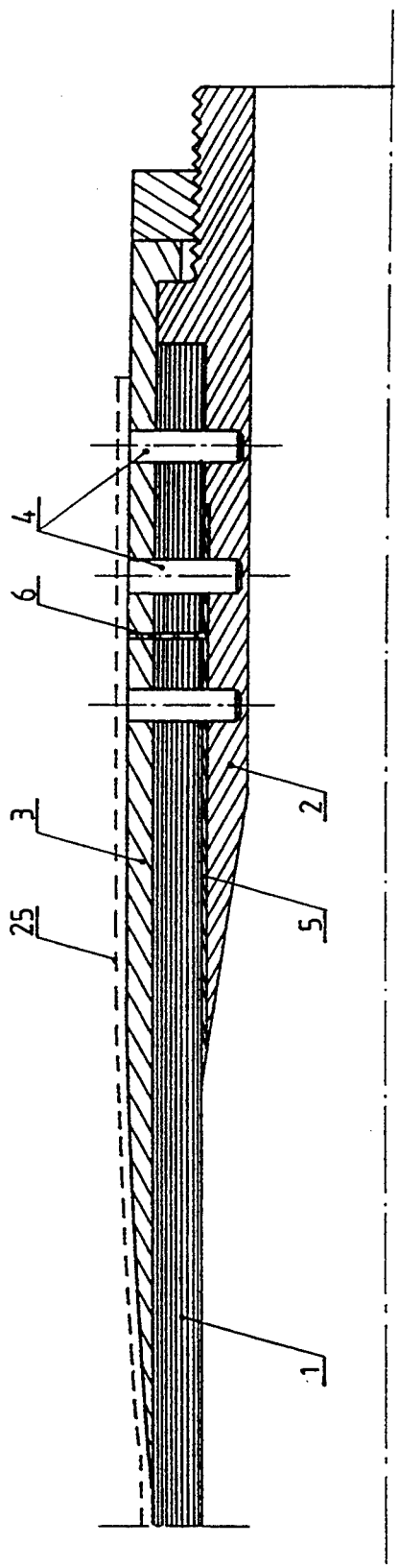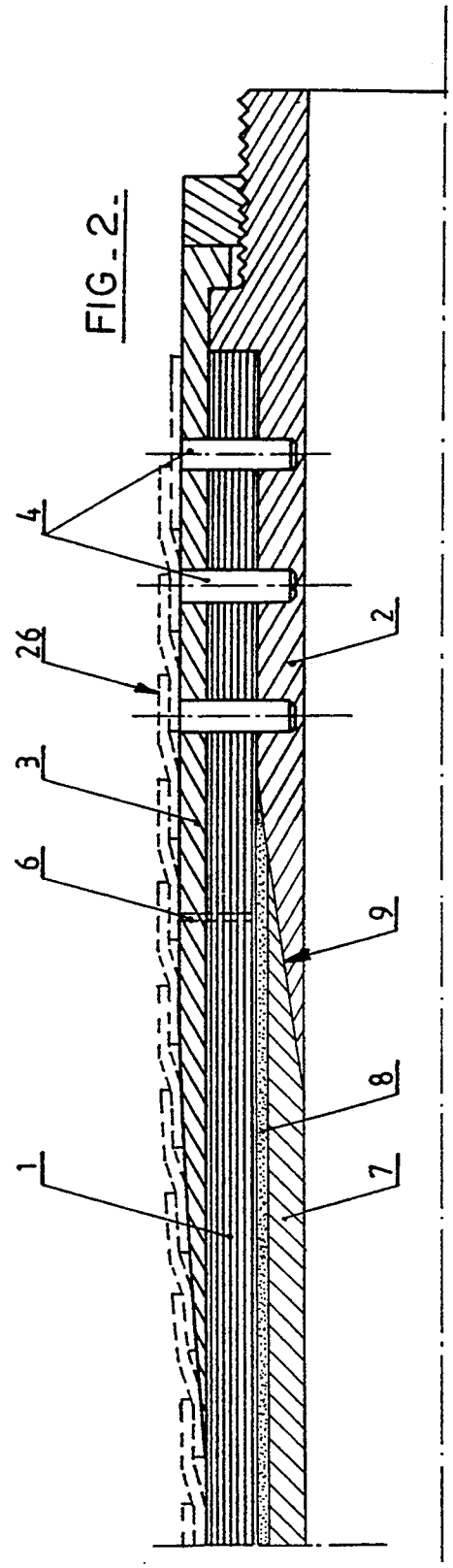

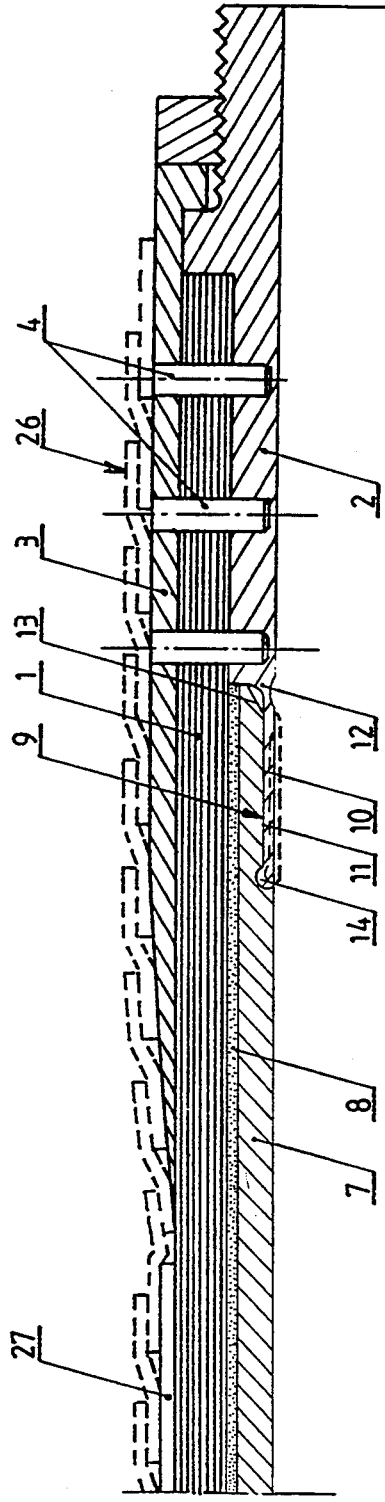
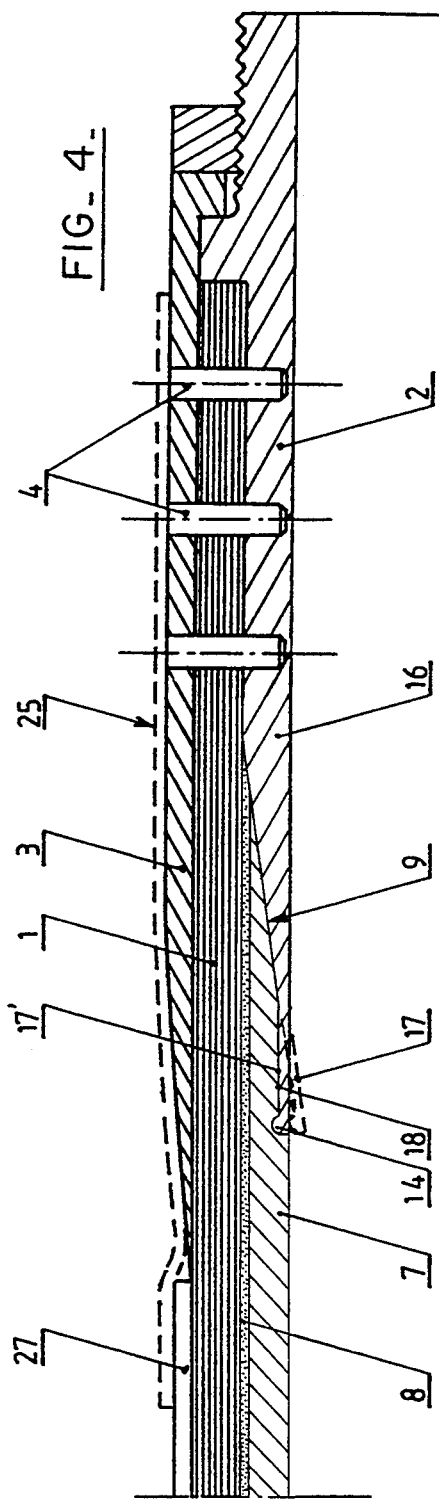

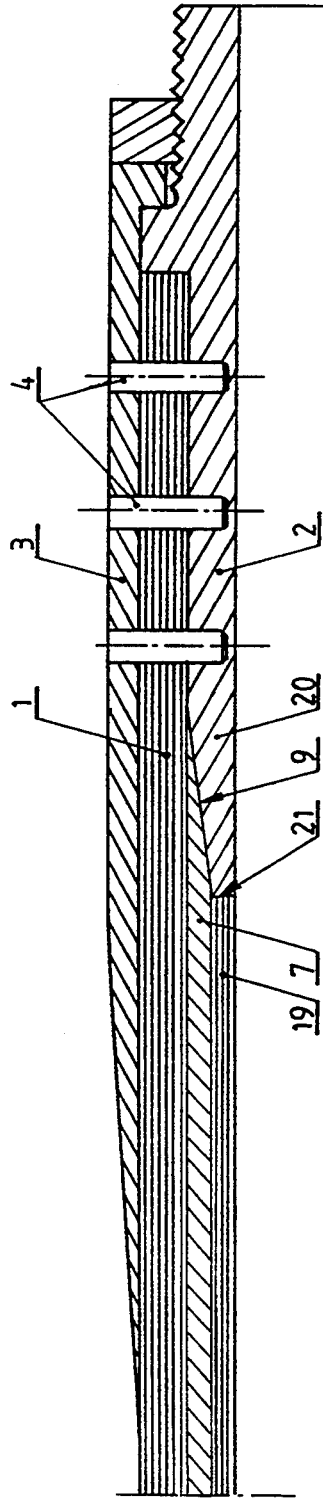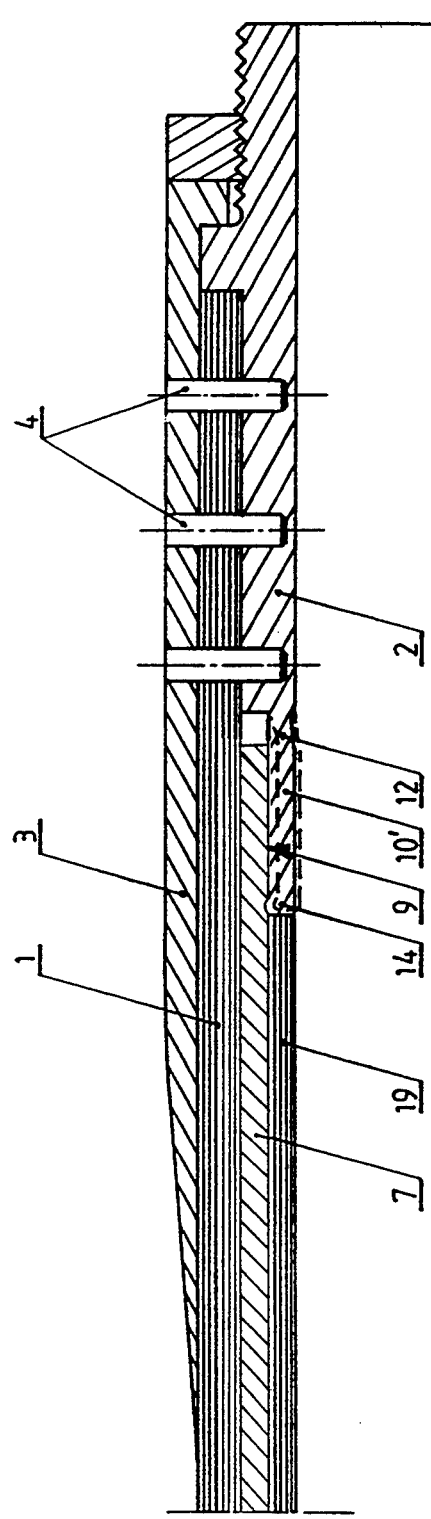

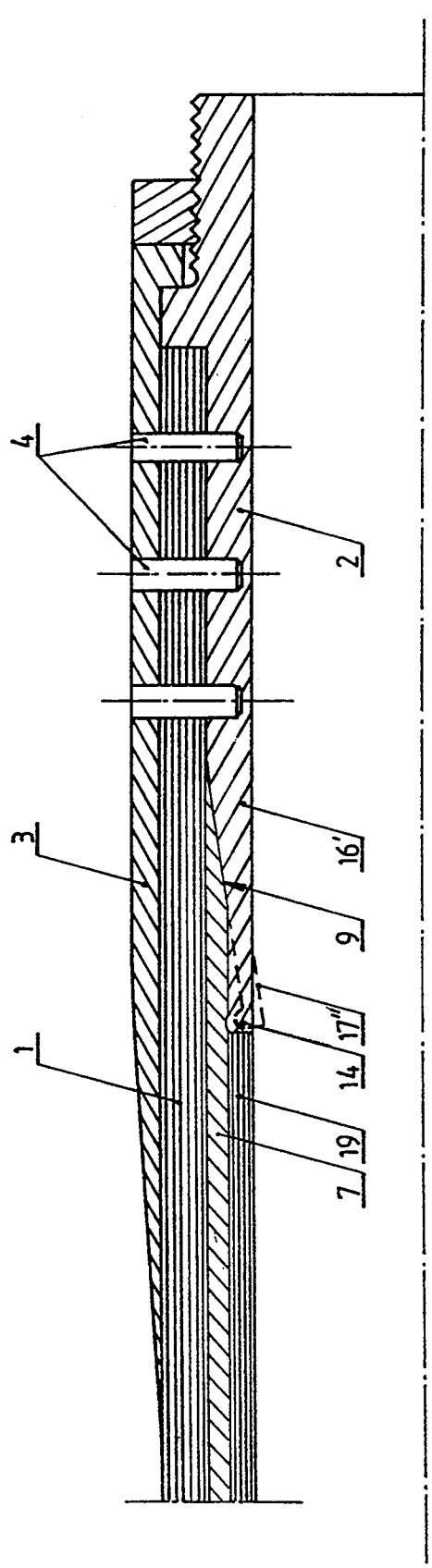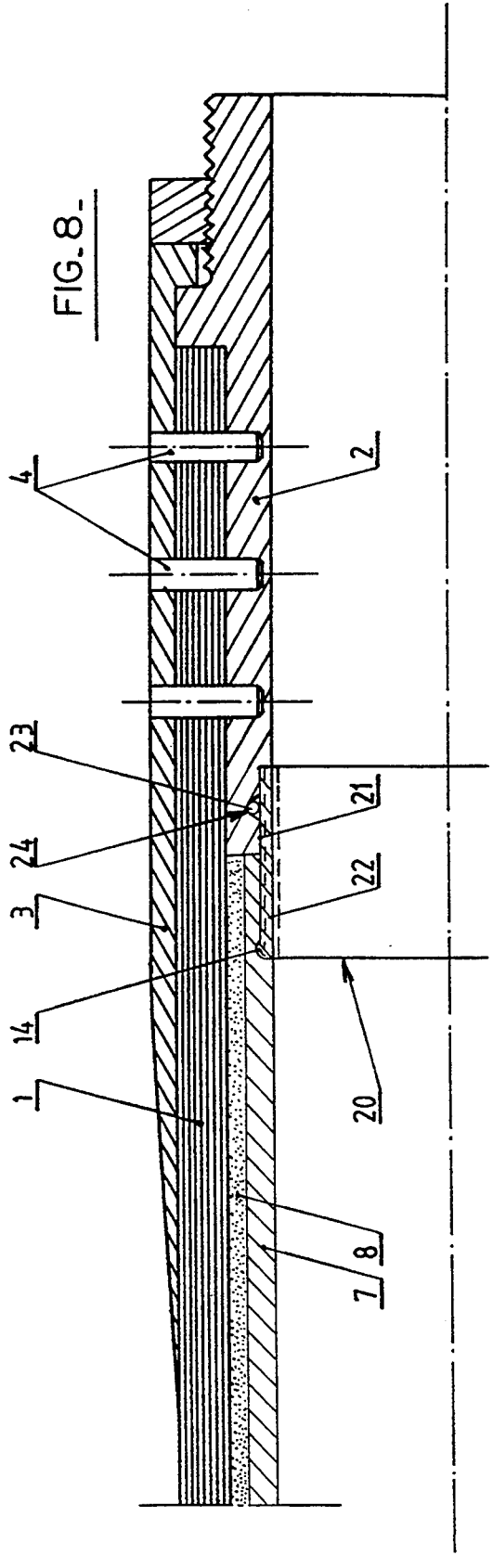

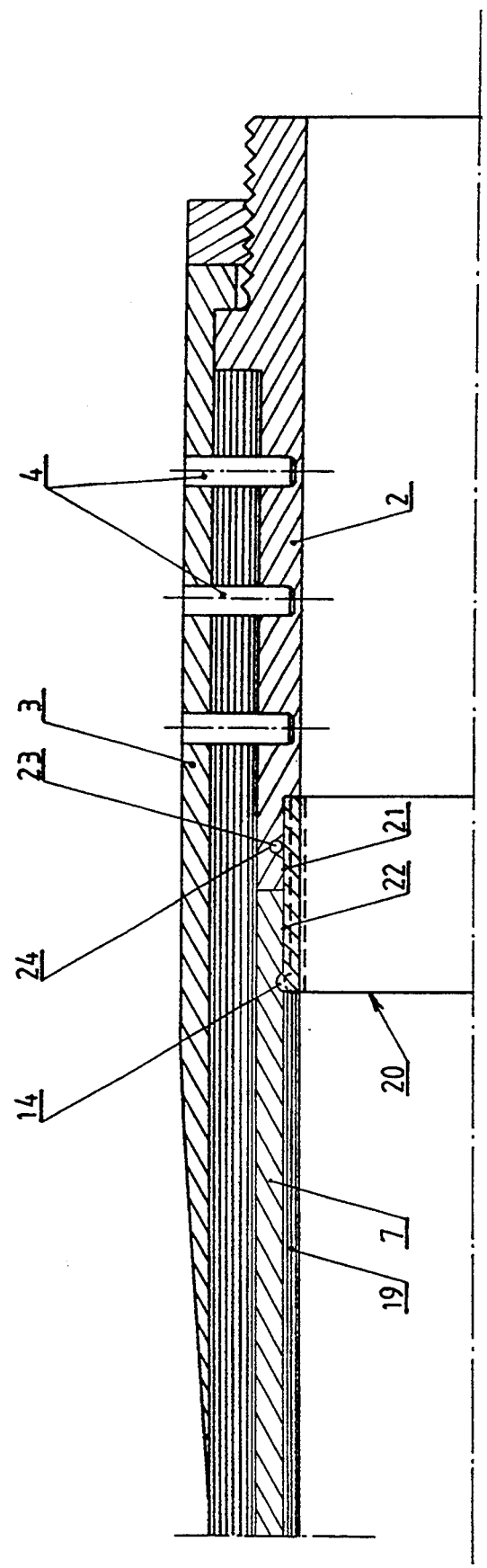
FIG-9-

TUBE OF COMPOSITE MATERIAL FOR DRILLING AND/OR TRANSPORT OF LIQUID OR GASEOUS PRODUCTS, IN PARTICULAR FOR OFFSHORE OIL EXPLOITATION AND METHOD FOR FABRICATION OF SUCH A TUBE

The present invention relates to tubes made up of composite material intended for drilling and/or transport of liquid or gaseous products, in particular for offshore exploitation and concerns more precisely tubes of the type with metallic end coupling members.

The tubes of composite material with metallic end coupling members are usually constituted by a part, so-called running part made up of a composite material, namely a material comprising mutually-parallel fibers, such as glass fibers, carbon fibers or aramid fibers, embedded in a matrix, such as a thermosetting matrix, for example an epoxy resin, joined, at its two ends, to metallic end coupling members, the connection being ensured by different techniques.

Such tubes can be used in particular in operations of offshore oil exploration and exploitation, for example as a rising column (also called "riser"), linking the sea bed to a surface support, or as a tube for production or water injection, or possibly for gas, (also called "tubing").

The rising columns are used for various purposes such as flow of oil products, of muds, of water or of gas, or insertion, inside the columns, of production tubes, drilling tools, of core-drilling tools, of measurement tools, etc., although the "tubings" serve only for the flow of fluids and are directly submerged in the sea or else inserted inside "risers".

In these types of tubes it is imperative that impermeability is ensured, from the inside to the outside, as much in the running part of the tubes as at the junction between this running part and the end coupling members, and together with non-degradation, in particular of the running part.

These tubes are constructed of a composite material whose matrix is a thermosetting resin, and whose fibers can be simple glass fibers (composite called "low-range") or carbon fibers, aramid fibers, associated or not associated with glass fibers (composite called "high-range"), the terms "low-range" and "high-range" being in the present description simple definitions to facilitate the statement of the invention.

The so-provided tubes subjected to a certain level of internal pressure are susceptible to having the impermeability of their running part degraded by cracking of the resin, resulting in penetration by hydrocarbons which can attack the fibers.

The aim of the invention is to overcome these drawbacks by proposing a tube of composite material of the type formed of a thermosetting resin matrix, equipped at each end, or at only one, with a metallic end coupling member arranged so as to provide an excellent impermeability, from the inside to the outside, as much along the running part of the tube as at the junction between this running part and the metallic end coupling member, while preserving the composite material especially against possible chemical attack.

To this end, the invention relates to a tube of composite material for drilling and/or transport of liquid or gaseous products, in particular for offshore oil exploitation, of the type constituted by a running part made up of a composite material with a thermosetting resin matrix, connected with, at least at one of its ends, a metallic end coupling member comprising a part engaged at least partially inside the composite tubular part, characterised in that the inner face of said composite tubular part is covered, on the one hand, by a tubular covering member in impermeable material, integral, especially in the axial direction of the tube, with said composite part and, on the other hand, by the outer face of said end coupling member part engaged inside the composite part, means being provided for ensuring an impermeable joining between the covering member and said end coupling member part.

The impermeable material of said covering member is preferably a thermoplastic material, in particular chosen from the group comprising polyamides, especially "Rilsan", popypropylenes and polyethylenes.

The invention applies more particularly, although not exclusively, to tubes of composite material having a composite tubular part of internal and external diameters which are constant from one end to the other.

The said impermeable joining means can be provided by a bevelled junction, a bonding and/or filling material being interposed or injected between the parts in contact.

Preferably, the covering member in place inside the composite tubular part has an internal diameter identical to that of the end coupling member part engaged in said composite tubular part and the bevelled junction is provided such that said inner end coupling member part inwardly covers said covering member.

Advantageously, an intermediate layer in fiber-filled thermoplastic resin is interposed between the composite tubular part and said inner covering member for the purposes of reinforcing the adhesion of said inner covering member to said composite tubular part.

Said impermeable joining means between the inner covering member and the end coupling member can be constituted by a metallic means covering the junction between the face-to-face parts and be crimped by radial expansion. Various embodiments of such a connection will be described below.

Moreover, for the purposes of preservation of the inner wall of such tubes, especially for their utilisation as "risers", against impacts and friction by objects subject to displacement inside the tubes and against the abrasive effects of solid particles liable to be transported by the products flowing in the tubes, at least the inner face of the inner covering member not masked by the end coupling member or members is covered with a tubular lining of a composite material with a thermosetting resin preferably a low-range resin in the sense defined above.

Preferably, the inner lining for protection against impacts and friction defines an internal diameter identical to that of the end coupling member or members.

Finally, with a view to ensuring an impermeable protection of the tube, from the outside to the inside, which is resistant to corrosive and abrasive agents contained especially in sea water, the outer face of the composite member of the tube, as well as at least one part of the adjacent outer wall of the end coupling member or members, are covered by a liner member in the form of a sleeve in an appropriate plastic material such as a thermoplastic, possibly heat-shrinkable, material or an elastomer.

Moreover, the invention also concerns a method for making such tubes.

Several embodiments of the tubes according to the invention will now be described, given solely by way of example and referring to the attached drawings, in which:

FIG. 1 is a half-view in vertical axial cross-section of the end of a tube of composite material provided with a metallic end coupling member;

FIG. 2 is a half-view in vertical axial cross-section of the end of a tube according to the invention, according to a first embodiment;

FIG. 3 is a half-view in vertical axial cross-section of the end of a tube according to the invention, according to a second embodiment;

FIG. 4 is a half-view in vertical axial cross-section of the end of a tube according to the invention, according to a third embodiment combining those of FIGS. 2 and 3;

FIG. 5 is a half-view in vertical axial cross-section of the end of a tube according to the invention, according to a fourth embodiment;

FIG. 6 is a half-view in vertical axial cross-section of the end of a tube according to the invention, according to a fifth embodiment;

FIG. 7 is a half-view in vertical axial cross-section of the end of a tube according to the invention, according to a sixth embodiment;

FIG. 8 is a half-view in vertical axial cross-section of the end of a tube according to the invention, according to a seventh embodiment, and FIG. 9 is a half-view in vertical axial cross-section of the end of a tube according to the invention, according to an eighth embodiment.

FIG. 1 represents a tube made up of a composite material with a metallic end coupling member, of known design, constituted by a tubular part i which is cylindrical over its whole length, of composite material, to at least one of whose ends is added a metallic end coupling member comprising a wedge-shaped part 2, or inner insert, partly inserted into the composite part 1, and a separate outer part 3 placed so as to grip the end of the tube 1 in a sandwich, the securing between composite tube 1 and metallic end coupling member 2, 3 being ensured by metallic pins 4.

The tube 1, which has its internal and external diameters constant over its whole length, is constituted, in the known manner, by a composite material comprising fibers of a single type, for example glass, carbon or aramid, or several types, wound along one or more angles and embedded in a matrix of thermosetting resin, for example an epoxy resin.

The said composite tubular part 1, or running part of the tube, can comprise glass fibers or carbon fibers or aramid fibers, associated or otherwise.

In the arrangement represented in FIG. 1, no impermeable liner has been provided on the inner face of the running part 1 of the tube, consequently, if such a tube is subject to internal pressures of a certain level, cracking of the thermosetting resin can appear, into which the hydrocarbons are liable to penetrate and thus affect the fibers.

Under conditions of internal pressure not exceeding such a level, this tube could be used, by perfecting the impermeability between the composite part and the metallic part of the end coupling members 2, 3 by injection of a filling product 5, for example of the thermoplastic type, along the composite/metal interface, by the use of a well or injection hole 6 formed, for example, as illustrated by FIG. 1, in the outer part 3 of the end coupling member and the composite tubular part 1, or in one of the pins 4, the hole then being made in the pin, with side holes at the level of the area to be filled, before said pin is put in place.

The present invention proposes solving the problem of impermeability, whatever the level of internal pressure, of the composite running part i of the tube, and of the composite/metal interface along the end coupling members, and the problem of the insulation of the composite material of the tube against possible attack, in particular chemical attack, by products, especially hydrocarbons, liable to be flowing in the tube, by providing, as illustrated by FIG. 2, at least one covering layer 7 for the inner wall of the running part 1 of the tube.

Said layer 7, according to the invention, is integral, in particular in the longitudinal direction of the tube, with the composite tubular part 1, and is made in a so-called pure thermoplastic material, that is to say without fiber added, and in direct contact with the inner insert 2 of the metallic end coupling member via an impervious connection. The layer 7 is for example in "Rilsan".

More precisely, in the embodiment of FIG. 2, the layer 7 is not directly in contact with the composite tubular part 1. An intermediate layer 8 is interposed, constituted by a material in so-called fiber-filled thermoplastic resin, that is to say in which are embedded glass or carbon fibers, or aramid fibers for example.

The intermediate layer 8 is optional and its role is essentially to produce more intimate adhesion of the layer 7 onto the composite running part 1.

On the other hand, the intermediate layer 8 need not be provided if the inner layer 7 is itself covered, on its inner face, by a liner made up of a thermosetting resin matrix composite as illustrated by the FIGS. 5,6,7,9, for purposes which will be explained later.

The layers 7 and 8 are for example made according to the teachings of the french patent No. 2.645.792 on behalf of the applicants.

Whether there is or is not an intermediate layer 8, the bonding of the layer 7 to the inner part 2 of the metallic end coupling member is made impermeably by a bevelled junction, the thickness of the layer 7, or of the layer 7/layer 8 assembly, being preferably determined so as to be equal to that of the part 2, in order to have an internal diameter of the finished tube which is constant from one end to the other.

In the embodiment shown in FIG. 2, the layers (7,8) and the end coupling member part 2 are in contact by means of their edge along a tapered junction plane 9, the end of said layers being sandwiched between the end coupling member 2 and the tube 1. An inverse bevelled junction could possibly be envisaged, the end of the end coupling member part 2 being sandwiched between the layers 7,8 and the tube 1, although this embodiment is more difficult to produce technically.

The impermeability along the interface 9 can be obtained in various ways. For example, a filler product of the thermoplastic type can be injected, through a hole 6 of the type of that in FIG. 1, into said interface 9. The bevelled edge of the end coupling member 2, can also be covered, before its insertion into the tube 1, by a thin layer of a thermoplastic material, such as "Rilsan" and the edge of the end coupling member 2 can therefore be thermally welded to that of the layers 7,8 or welded by any other technique, with or without the addition of material.

FIG. 3 illustrates another way of ensuring the impermeable junction between the layers 7,8 and the end coupling member part 2.

The latter is machined so as to constitute, in the projection of the inner end of said part 2, a cylindrical crimping ferrule 10 of reduced thickness, suitable for covering the end of the layer 7 which is, to this end, notched in order to provide a housing 11 to receive the ferrule 10, whose depth is calculated in order that, once the ferrule 10 has been crimped, the inner face of the latter should be substantially level with the inner faces of the end coupling member 2 and of the layer 7.

In order to facilitate crimping, advantageously the ferrule 10 is machined so as to be connected to the body 2 by a bridging part 12, slightly arched towards the outside, the inner edge of the layer 7 being bevelled at 13 to leave the necessary clearance. In the same way, the outer edge of the ferrule 10 advantageously comprises a sealing bead 14 which, after crimping, will locally ensure a better impermeable contact.

The outer face of the ferrule 10 can comprise circumferential protrusions, also in order to improve the impermeable contact.

The impermeability normally obtained by crimping can be reinforced by heating during crimping and/or application of a thermoplastic filler material on the interface 9, as in the example of FIG. 2.

FIG. 4 illustrates an alternative combining the bevelled junction of FIG. 2 and the crimping according to FIG. 3. To this end, the end of the part 2 of the end coupling member is first of all machined into a bevel (16), as in FIG. 2, then extended by a thin part 17 of constant thickness and of truncated-conical shape. The part 17 is fitted with notches (not shown) arranged along generatrix, distributed over the circumference of said part 17 in order to facilitate the outward expansion during crimping.

In the same way the end of the layers 7,8 is bevelled to correspond with the part 16 and a housing 18, similar to the housing 11 of FIG. 3, is provided in the inner face of the layer 7. A sealing bead 14 or circumferential protrusions are advantageously provided, as in the embodiment of FIG. 3.

On crimping, the part 17 comes to press (17') against the bottom of the housing 11, the inner face of the part 17 coming substantially in line with the inner walls of the layer 7 and of the end coupling member 2.

The impermeability along the thermoplastic-material-metal junction can be reinforced by means similar to those referred to above (thermal welding, thermoplastic filler material in the interface 9, etc...)

In this embodiment, as well as in the case of FIG. 3, the intermediate layer 8 need not be provided.

In the embodiment of FIG. 5, in accordance with the invention and with a view to preserving the thermoplastic material of the layer 7 against impacts, friction and abrasion which it could not withstand, the tube being more especially intended for providing "risers", the inner face of said layer 7 is lined with a skin 19 made up of a composite material with a thermosetting resin, preferably a "low-range" type resin in the sense defined above.

The skin 19 can be for example a simple composite of the glass/epoxy type and covers the whole of the inner face of the layer 7 between the end coupling member parts 2, the thickness of the skin 19 being determined such that the inner face of the skin is level with that of the end coupling member parts 2.

The end of the end coupling member part 2 is bevel-shaped at 20 in order to be bound to the layer 7, as in the examples of FIGS. 2 and 4, and is terminated by a straight edge 21 coming to abut against the edge of the skin 19.

The impermeability along the interface 9 (layer 7/end coupling member 2 junction) can be obtained as set out above in connection with the embodiments of FIGS. 2 and 4.

An intermediate layer of the type of the layer 8 of FIGS. 2 to 4 can possibly be interposed between the tube 1 and the layer 7.

FIG. 6 illustrates an alternative of embodiment of FIG. 3 applied to the case where a skin 19 for protection against impacts and wear would be provided on the inner face of the layer 7 of FIG. 3.

The end coupling member part 2 is extended by a cylindrical ferrule 10' for crimping similar to the ferrule 10 of FIG. 3 and suitable for crimping directly against the opposite face of the layer 7 without the prior preparation of this face. A sealing bead 14 or circumferential protrusions are advantageously provided, as in the embodiment of FIGS. 3 and 4.

After crimping, the inner face of the ferrule 10' is substantially flush with that of the layer 19 and of the end coupling member part 2.

The layer 7 does not come to abut against the part 2 in order to leave some clearance at the bridging piece 12 of the ferrule during crimping of the latter.

The interface 9 is possibly given supplementary impermeability as in the examples of FIGS. 2 to 5, by the same means as those set out.

FIG. 7 illustrates the application of the crimped end coupling member of FIG. 4 to a composite tube comprising an impermeable and anti-corrosion layer 7 and a skin 19 against impacts, friction and wear.

The bevelled part 16' of the end coupling member 2 is in contact via a bevelled junction with the layer 7 while the ferrule 17" is crimped against the inner face of said layer 7. After crimping, the inner face of the ferrule 17" is substantially flush with that of the skin 19 and of the end coupling member 2.

The interface 9 is possibly given supplementary impermeability as in the examples of FIGS. 2 to 6, by the same means.

FIGS. 8 and 9 illustrate two other embodiments in which the junction between thermoplastic material and metal is provided by an expanded cylindrical metallic ring 20.

To this end, the ring 20 is, before expansion, arranged so as to overlap the end coupling member part 2 and the thermoplastic element provided on the inner face of the composite tubular part 1 of the tube, which element is either (FIG. 8) a layer 7 in a material of the type of the layers 7 of the preceding embodiments, an intermediate layer 8 being interposed (or not) between the layer 7 and the running part 1, or (FIG. 9) a layer 7 of the same nature as above, covered by a skin 19 of the type of the skins 19 of the preceding examples.

The ring 20 is received in housings 21,22 provided to this effect respectively, on the one hand, in the inner face of the end coupling member part 2, and, on the other hand, in the inner face of the layer 7 (FIG. 8) or of the layer 7/skin 19 assembly (FIG. 9). In both cases, the ring 20 will come, when it has been expanded (by any appropriate means), into impermeable crimping contact with the thermoplastic material of the layer 7.

The rim (composite side) of the ring 20 is fitted externally with a sealing bead 14 ensuring locally, after expansion of the ring 20, a better impermeable contact and, for impermeability reasons, at least one annular seal 23 is received and compressed into a groove 24 provided in the wall of the housing 21. The outer face of the ring 20 can be provided with circumferential protrusions.

one of the advantages of the use of an additional ring such as the ring 20 resides in the fact that the material of this ring can be chosen for its suitability for efficient crimping. Moreover, during the expansion of the ring 20, the seal or seals 23 will be compressed, this allowing, without breaking the impermeability, possible relative movements, axially to the tube, between the end coupling member and the running part of the tube.

Generally speaking, the crimping of the appropriate part of the end coupling member 2, and the expansion of the ring 20 when this solution is chosen, are carried out in such a way as to strain the metal in question and to bring it beyond its elasticity range, the strain being irreversible.

Generally speaking, the various tubes illustrated by FIGS. 2 to 9, and all the tubes in accordance with the invention, can be externally covered with sleeve providing impermeability, from the outside to the inside of the tube, in material resistant to corrosive and abrasive agents liable to be found in the environment in which the tube will be received.

This sleeve can be, for example, in thermoplastic, possibly heat-shrinkable material. Polypropylene, polyethylene or "Rilsan" can especially be used.

The sleeve covers the composite tubular part 1 of the tube and the outer part of the metallic end coupling members, so as to cover at least the pins 4.

Such a sleeve can be a heat-shrinkable material sleeve, as shown schematically at 25 in FIG. 1, or constituted, as shown schematically at 26 in FIG. 2, by an overlapping taping. The taping is carried out hot and enables the turns to be welded together and to the metallic part and, over the running part of the tube, enables the turns alone to be welded together.

If the tube 1 comprises an outer layer 27 in thermoplastic material of the type of that of the layers 7 of the examples described above, as illustrated by FIGS. 3 and 4, the layer 27/end coupling member 3 junction is covered, either by a taping 26 (FIG. 3), or by a heat-shrinkable material sleeve 25 (FIG. 4).

Generally speaking, all the inner thermoplastic-material-metal junctions, whatever they are carried out, can be subjected to an injection of an appropriate filler product, as illustrated by FIG. 2, or, using another technique, at the location of the layer 7/metal interface.

The invention applies to tubes whose composite tubular part is of constant (internal and external) diameter from one end to the other, but also to tubes having at the ends, as far as the composite part is concerned, a diameter, especially an external diameter, greater than that of the running part of the tube.

The invention also applies to any tube in composite material and with metallic end coupling members, whatever the shapes and arrangements of the end coupling member and the means for joining the latter to the composite part of the tube.

The invention also applies to tubes whose running part in composite material is not simply constituted by a single material, such as the constituent material of the running part 1 of the embodiments illustrated by the attached drawings, but can be constituted by several concentric layers of materials, composite or otherwise, of different natures and characteristics.

In all the cases in question, it is to be noted that the layers according to the invention, such as those shown at 7 and 8 in the drawings, are integral with the inner face of the composite running part of the tube. These layers 7,8 thus "follow" especially the possible elongations and contractions in the longitudinal direction of the tube of said composite running part.

The invention also concerns a method for industrial production of such tubes starting advantageously from tubes already held in stock, especially tubes produced according to the French Patent No. 2.645.792 quoted above.

Such tubes are constituted by a running part in composite material of thermosetting resin, of constant internal and external diameters, fitted internally with a thermoplastic material layer of the type of the layer 7 of the examples described above, possibly with interposition of a layer of fiber-filled thermoplastic resin of the type of the layer 8. Said thermoplastic material layer is possibly covered internally with a skin in composite material of thermosetting resin of the type of the skin 19.

In accordance with the invention, such tubes are cut to the desired length, with a view to providing the ends with end coupling members of the type illustrated in FIGS. 1 to 9 described above and to this purpose the ends of the inner layers of the running part of the tubes are machined in order to make space for the end coupling member 2, and prepare the bond between said thermoplastic material layer and the metallic part of the end coupling members 2. If a bevelled junction as illustrated by FIGS. 2,5,7 is provided, the edge of said thermoplastic material layer will be bevelled. If a junction by crimping or expansion of a ring 20 as illustrated by FIGS. 3,8,9 is provided, the housings 11,22 will be machined.

The end coupling member parts 2 will moreover be machined according to the type of junction desired.

The end coupling members 2 are next put in place on the ends of the tubes thus prepared, the integration between the metal of the end coupling member 2 or of the ring 20 and said thermoplastic material layer, and the possible supplementary filler, being produced according to one of the methods described above. In connection with this, it is to be noted that in the bevelled joint embodiments, the welding can be carried out by mutual rotation between the running part of the tube and the end coupling member 2, the end coupling member parts 3 and the pins 4 being put in place afterwards.

Starting from tubes having a layer such as the layer 19 on the inner face of said thermoplastic material layer, this layer will of course consequently be machined.

Finally, if starting from existing tubes also comprising an outer layer of the type of the layer 27 (FIGS. 3 and 4), this layer will also be machined with a view to putting in place the end coupling members, then the taping 26 or the sleeve 25, if such linings are desired.

It is moreover to be noted that, in the embodiments with crimping or expansion of a ring, the crimping step or the like is carried out after putting in place the outer end coupling member parts 3 and pins 4, the part 3 covering well beyond the crimping or expansion area and forming like an anvil, thus ensuring a homogeneous and efficient crimping.

The above method clearly applies to the case of pre-existing tubes comprising in place of a thermoplastic material layer 7 an elastomeric layer of the type indicated above.

Finally, the invention is obviously not limited to the embodiments shown and described above, but on the contrary covers any alternative embodiments especially concerning the nature and the characteristics of the various materials used, both as far as the running part (1) of the tube is concerned and the liners 7,8,19 provided according to the invention, the arrangements of the parts comprising a thermoplastic material and the parts in metal to be put in contact in an impermeable manner and the means for ensuring said impermeability.

While the liner member 7 according to the invention has been described as being constituted preferentially by a thermoplastic material, it could be contemplated that the material used to constitute said layer 7 could be an elastic material such as an elastomer and in particular BUNA, HNBR (Hydrogeneted Nitrile Buna Rubbers), or any other impermeable material likely to be suitable.

In the case of utilisation of an elastomeric layer 7, the junction between this layer and the metallic part (end coupling member 2 or ring 20) would be adhesively bonded and not welded.

We claim:

1. A tube, comprising:
   a tubular part of composite material with a thermosetting resin matrix, said tubular part having at least one end and an inner face;
   a metallic end coupling member connected to said one end of said tubular part and at least partially engaged and in contact with said tubular part, said end coupling member having an exterior surface directly engaging a portion of said inner face of said tubular part and having an interior surface and an inner end;
   a tubular covering member of impermeable material over said inner face of said tubular part and integrally attached to said tubular part, but terminating adjacent said inner end of said end coupling member so as not to cover said interior surface of said end coupling member and said portion of said tubular part inner face which engages said exterior surface of said end coupling member; end
   joining means for forming an impermeable joint between said end coupling member and said covering member;
   whereby said inner face of said tubular part is covered by said end coupling member and said covering member.

2. A tube according to claim 1 wherein said joining means comprises a bevelled joint and filler material interposed between contacting portions of said end coupling member and said covering member.

3. A tube according to claim 2 wherein
   said covering member and said end coupling member have substantially identical internal diameters; and
   said end coupling member covers an inner surface of said covering member in said bevelled joint inside said tubular part.

4. A tube according to claim 1 wherein said covering member is thermoplastic material selected from the group consisting of polyamides, polypropylenes and polyethylenes.

5. A tube according to claim 4 wherein said covering member is Rilsan.

6. A tube according to claim 1 wherein said covering member is elastomeric material.

7. A tube according to claim 6 wherein said elastomeric material is hydrogenated nitrile buna rubber.

8. A tube according to claim 4 wherein intermediate layer, formed of a composite material including fiber-filled thermoplastic resin, is interposed between said tubular part and said covering member to reinforce adhesion of said covering member to said tubular part.

9. A tube according to claim 1 wherein said joining means comprises a metallic means for covering a junction between facing portions of said end coupling member and said covering member, said metallic means being crimped by radial expansion.

10. A tube according to claim 9 wherein said metallic means comprises a ferrule integral with said end coupling member.

11. A tube according to claim 10 wherein said ferrule is cylindrical, and is connected to a body of said end coupling member by a bridging section.

12. A tube according to claim 9 wherein said metallic means comprises an expanded cylindrical ring, said ring overlapping said joint and being received in respective housings in said end coupling member and said covering member.

13. A tube according to claim 12 wherein at least one seal is interposed between said ring and said end coupling member.

14. A tube according to claim 10 wherein said metallic means comprises a ferrule having an impermeability sealing head protruding circumferentially from an outer surface of said ferrule.

15. A tube according to claim 9 wherein filler material is injected between said end coupling member and said covering member.

16. A tube according to claim 1 wherein a tubular liner of thermosetting resin composite material covers an inner surface portion of said covering member not covered by said end coupling member.

17. A tube according to claim 16 wherein said tubular liner and said end coupling member have substantially identical internal diameters.

18. A tube according to claim 1 wherein a sleeve member of plastic material covers outer surfaces of said tubular part and said end coupling member, said plastic material selected from the group consisting of thermoplastics and elastomers.

19. A tube according to claim 18 wherein said sleeve member is formed of heat-shrinkable material.

20. A tube according to claim 18 wherein said sleeve comprises a tape welded along said end coupling member.

21. A tube according to claim 1 wherein
   said coupling member comprises an inner end portion extending away from said one end of said tubular part and spaced from said tubular part; and
   a portion of said covering member being trapped between said inner end portion of said coupling member and an adjacent section of said tubular part.

22. A tube according to claim 1 wherein
   said joining means is only between said end coupling member and said covering member, and does not connect said tubular part to said covering member and to said end coupling member.

* * * * *